Ford & Garbutt,
Washing Machine.
No. 107,470. Patented Sep. 20. 1870.

Witnesses
J. S. Shuck
W. W. Miller

Inventors
Charles Ford, and
Frank C. Garbutt

UNITED STATES PATENT OFFICE.

CHARLES FORD AND FRANK C. GARBUTT, OF MASON, ILLINOIS.

IMPROVEMENT IN WASHING-MACHINES.

Specification forming part of Letters Patent No. 107,470, dated September 20, 1870.

We, CHARLES FORD and FRANK C. GARBUTT, of Mason city, in the county of Mason and State of Illinois, have invented certain Improvements in Washing-Machines, of which the following is a specification:

Nature and Object of the Invention.

First, to secure a good washing attachment for a common tub and board; secondly, to closely imitate and much increase the hand-like motion on a common wash-board, which, experience proves, is the only one that removes streaks from very dirty wristbands and collars; thirdly, compactness, simplicity, and economy.

Figure 2:
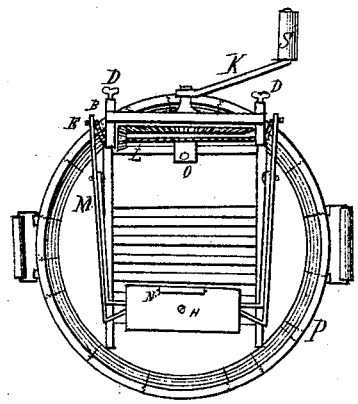
Figure 1:
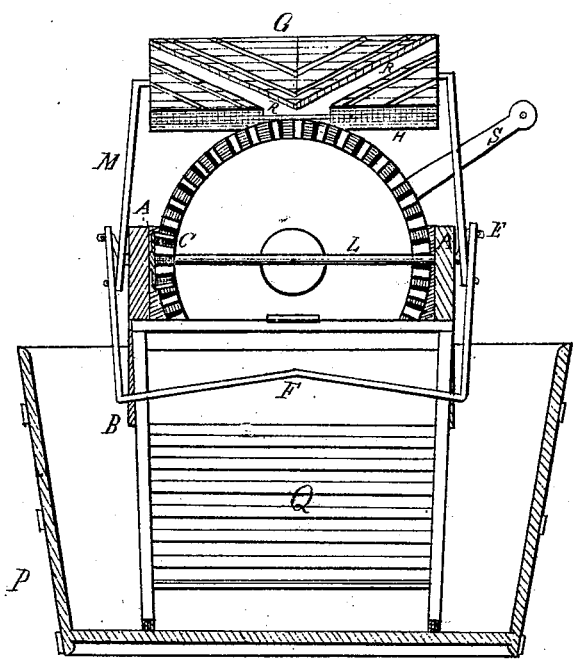

Figure 1, side view, with rubber thrown back, and holder elevated. Fig. 2 is a top view.

Description.

The frame A is made with legs B, to slip down on the sides of the tub. In two of these legs are thumb-screws D, for securing the whole firmly. The bevel-wheel is fixed on the short shaft, as is the crank K; also, the pinion on the shaft L, which has a crank, E, fixed on each end. To these cranks the holder F or arms M attach. To the arms M the rubber G hinges, or it may hinge directly to the cranks E, in which case the holder can be dispensed with. The holder F fits in a corresponding groove in the under side of the rubber, so as not to wear on the wash-board. The rubber is made with little strips of india-rubber, set edgewise, standing out three-eighths of an inch, and running at an angle with the ridges of the wash-board, upon which it rubs, the object being to present a yielding surface, which, like the hand, presses and rubs the clothing over the board without tearing the goods or breaking the buttons. The arms M hinge in such a way that the rubber G may be turned back, so that goods may be placed on the holder on the board, and secured there by the rubber when turned down to the board. On the top of the rubber is a weight, H, which may be removed when less friction on the goods is preferred.

Claims.

We claim as our invention—

1. The construction and combination of the frame A, gear C, crank E, arms M, rubber G, and wash-board Q, substantially as and for the purpose hereinbefore set forth.

2. The construction and combination of the weight H, groove R, and india-rubber strips or ridges in and on the rubber G, with or without the holder F, substantially as and for the purpose hereinbefore set forth.

CHARLES FORD.
FRANK C. GARBUTT.

Witnesses:
W. W. MILLER,
ANDY McELHENY.